US012331902B2

(12) United States Patent
Matsuo

(10) Patent No.: US 12,331,902 B2
(45) Date of Patent: Jun. 17, 2025

(54) VEHICLE LIGHTING DEVICE AND VEHICLE LAMP

(71) Applicant: Toshiba Lighting & Technology Corporation, Kanagawa (JP)

(72) Inventor: Tomohiro Matsuo, Ehime-ken (JP)

(73) Assignee: Toshiba Lighting &Technology Corporation, Kanagawa (JP)

( * ) Notice: Subject to any disclaimer, the term of this patent is extended or adjusted under 35 U.S.C. 154(b) by 0 days.

(21) Appl. No.: 18/792,524

(22) Filed: Aug. 1, 2024

(65) Prior Publication Data

US 2025/0093006 A1 Mar. 20, 2025

(30) Foreign Application Priority Data

Sep. 14, 2023 (JP) ................................ 2023-149482

(51) Int. Cl.

*F21S 41/43* (2018.01)
*F21S 41/143* (2018.01)
*F21S 41/151* (2018.01)
*F21V 23/00* (2015.01)
*F21W 102/20* (2018.01)
*F21Y 115/10* (2016.01)

(52) U.S. Cl.

CPC ............. *F21S 41/43* (2018.01); *F21S 41/143* (2018.01); *F21S 41/151* (2018.01); *F21V 23/003* (2013.01); *F21W 2102/20* (2018.01); *F21Y 2115/10* (2016.08)

(58) Field of Classification Search

CPC ........ F21S 41/43; F21S 41/143; F21S 41/151; F21V 23/003

USPC .......................................................... 362/539

See application file for complete search history.

(56) References Cited

U.S. PATENT DOCUMENTS

| | | | | |
|---|---|---|---|---|
| 7,854,538 | B2 * | 12/2010 | Helms | F21S 41/172 362/228 |
| 9,651,219 | B2 * | 5/2017 | Dassanayake | F21K 9/232 |
| 9,995,441 | B2 * | 6/2018 | Power | F21V 7/043 |
| 10,371,324 | B2 * | 8/2019 | Giametta | B60Q 1/0052 |

(Continued)

FOREIGN PATENT DOCUMENTS

| | | |
|---|---|---|
| DE | 102015206471 | 10/2016 |
| JP | 2016195099 | 11/2016 |
| JP | 2019036406 | 3/2019 |

*Primary Examiner* — Bryon T Gyllstrom
(74) *Attorney, Agent, or Firm* — JCIPRNET

(57) ABSTRACT

The disclosure provides a vehicle lighting device and a vehicle lamp. The vehicle lighting device includes: a socket; five light-emitting elements, provided on one end side of the socket; and a brightness controller, provided on a light-emitting side of the light-emitting elements and having a plurality of light-shielding parts and a light-transmitting part. One of the light-emitting elements is provided at a position on a central axis of a vehicle lighting device. Four of the light-emitting elements are provided at positions that are rotationally symmetric on a circumference centered on the central axis, respectively. The brightness controller faces the one light-emitting element provided at a position on the central axis. The brightness controller does not face the four light-emitting elements provided at a position on the circumference. The plurality of light-shielding parts provided in the brightness controller are not provided at positions on the central axis.

7 Claims, 5 Drawing Sheets

(56) References Cited

U.S. PATENT DOCUMENTS

| | | | | |
|---|---|---|---|---|
| 2013/0235582 | A1* | 9/2013 | Breidenassel | F21K 9/232 362/241 |
| 2014/0009936 | A1* | 1/2014 | Hata | F21K 9/64 362/235 |
| 2014/0347874 | A1* | 11/2014 | Nakaya | F21S 41/16 362/510 |
| 2015/0009677 | A1* | 1/2015 | Catalano | F21S 10/00 362/296.07 |
| 2016/0025273 | A1* | 1/2016 | van de Ven | F21K 9/23 362/293 |
| 2016/0320004 | A1* | 11/2016 | Tudorica | F21V 29/83 |
| 2018/0073714 | A1 | 3/2018 | Ozawa et al. | |
| 2019/0195460 | A1 | 6/2019 | Ano et al. | |
| 2019/0267355 | A1 | 8/2019 | Ueno | |
| 2020/0182432 | A1 | 6/2020 | Ueno | |
| 2021/0317963 | A1 | 10/2021 | Ueno | |

* cited by examiner

VEHICLE LIGHTING DEVICE AND VEHICLE LAMP

CROSS-REFERENCE TO RELATED APPLICATION

This application claims the priority benefit of Japanese application no. 2023-149482, filed on Sep. 14, 2023. The entirety of the above-mentioned patent application is hereby incorporated by reference herein and made a part of this specification.

BACKGROUND

Technical Field

Embodiments of the disclosure relate to a vehicle lighting device and a vehicle lamp.

Related Art

From the viewpoints of energy saving and longevity, vehicle lighting devices equipped with light-emitting elements such as light-emitting diodes are becoming more and more popular, instead of vehicle lighting devices equipped with lamps having filaments. A vehicle lighting device having a light-emitting element includes a socket and a light-emitting module provided on one end of the socket and having a plurality of light-emitting elements.

Here, the brightness distribution of the portion of the vehicle lighting device from which light is emitted has a significant effect on the optical design of the optical element provided in the vehicle lamp. For this reason, a technology has been proposed in which four light-emitting elements are provided at positions that are rotationally symmetric on a circumference centered on the central axis of the vehicle lighting device. However, when the number of light-emitting elements is four, the amount of light emitted from the vehicle lighting device may be insufficient. Thus, a technology has been proposed in which an additional light-emitting element is provided at the central axis position of the vehicle lighting device, thereby increasing the number of light-emitting elements to five.

However, if a light-emitting element is further provided at the central axis position of the vehicle lighting device, a new problem occurs in that a desired brightness distribution cannot be obtained. Thus, there has been a demand for development of a technology that may increase the amount of light emitted from a vehicle lighting device and obtain a desired brightness distribution.

CITATION LIST

Patent Literature

[Patent Literature 1] Japanese Patent Application Laid-Open (JP-A) No. 2016-195099.

The disclosure provides a vehicle lighting device and a vehicle lamp that may increase the amount of light emitted from the vehicle lighting device and obtain a desired brightness distribution.

SUMMARY

The vehicle lighting device according to the embodiments includes: a socket; five light-emitting elements, provided on one end side of the socket; and a brightness controller, provided on a light-emitting side of the light-emitting elements and having a plurality of light-shielding parts and a light-transmitting part. One of the light-emitting elements is provided at a position on a central axis of a vehicle lighting device. Four of the light-emitting elements are provided at positions that are rotationally symmetric on a circumference centered on the central axis, respectively. The brightness controller faces the one light-emitting element provided at a position on the central axis. The brightness controller does not face the four light-emitting elements provided at a position on the circumference. The plurality of light-shielding parts provided in the brightness controller are not provided at positions on the central axis.

DESCRIPTION OF THE EMBODIMENTS

Figure 1:
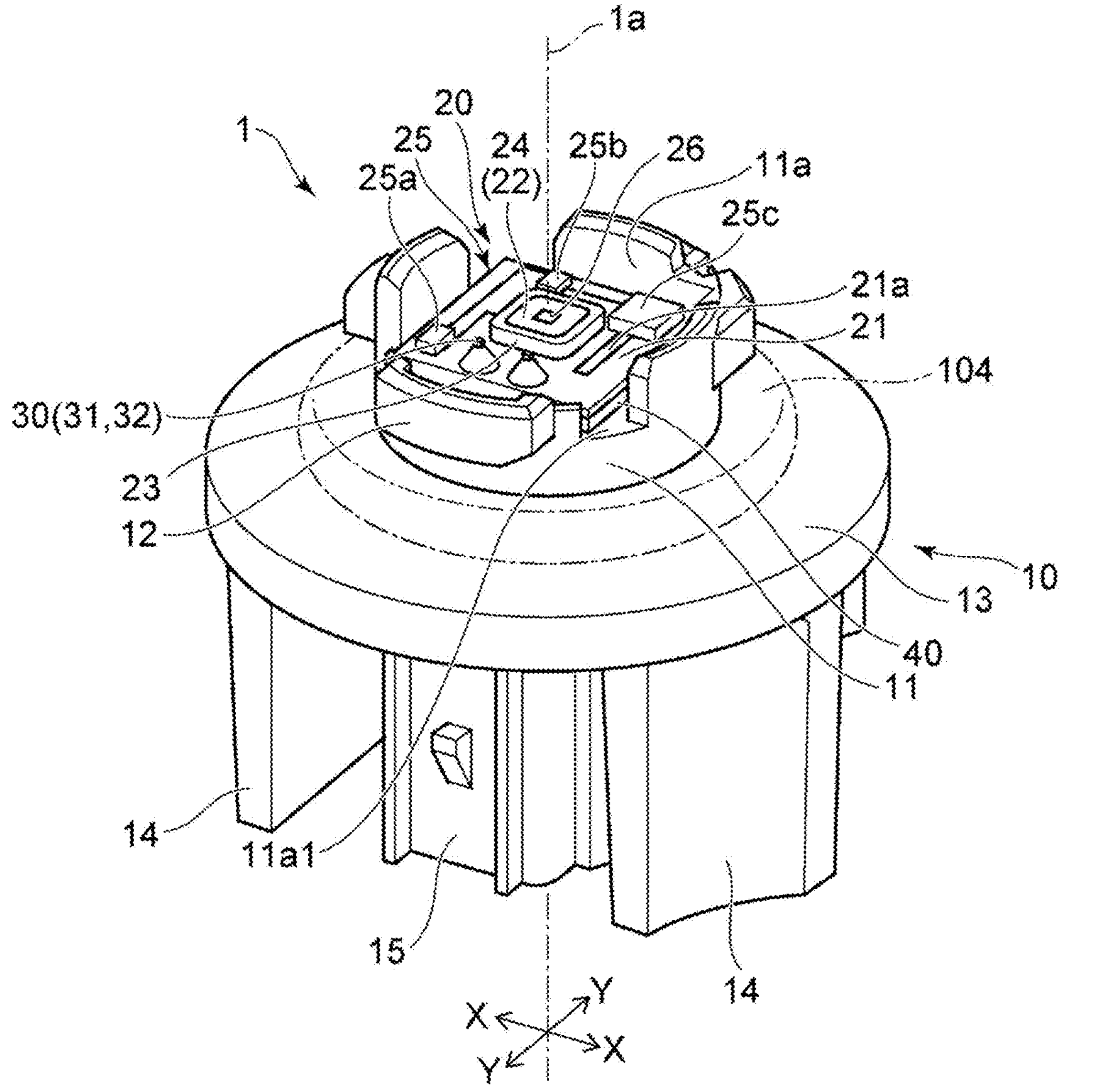
FIG. 1 is a schematic perspective diagram for illustrating the vehicle lighting device according to the embodiment.

According to the embodiments of the disclosure, it is possible to provide a vehicle lighting device and a vehicle lamp that may increase the amount of light emitted from the vehicle lighting device and obtain a desired brightness distribution.

Hereinafter, embodiments will be illustrated with reference to the drawings. Moreover, in each drawing, similar components are denoted by the same reference numerals, and detailed explanations are omitted as appropriate.

(Vehicle Lighting Device)

A vehicle lighting device 1 according to the embodiment may be installed in, for example, an automobile or a railway vehicle. Examples of the vehicle lighting device 1 provided in an automobile those used for a front combination light (for example, an appropriate combination of Daytime Running Lamp (DRL), position lamp, turn signal lamp, etc.) or a rear combination light (for example, an appropriate of stop lamp, tail lamp, turn signal lamp, back lamp, fog lamp, etc.). However, the uses of the vehicle lighting device 1 are not limited thereto.

FIG. 1 is a schematic perspective diagram for illustrating the vehicle lighting device 1 according to the embodiment. As shown in FIG. 1, the vehicle lighting device 1 includes, for example, a socket 10, a light-emitting module 20, a power feed part 30, and a heat transfer part 40.

The socket 10 includes, for example, an attaching part 11, a bayonet 12, a flange 13, a radiation fin 14, and a connector holder 15. The attaching part 11 is provided on a surface of the flange 13 on an opposite side to a side where the radiation fin 14 is provided.

An outer shape of the attaching part 11 may be columnar. The outer shape of the attaching part 11 is, for example, cylindrical. The attaching part 11 has, for example, a recess 11*a* that opens at an end on an opposite side to the flange 13 side.

The bayonet 12 is provided, for example, on a side surface of the attaching part 11. The bayonet 12 protrudes toward an outer side of the vehicle lighting device 1. The bayonet 12 faces the flange 13. A plurality of bayonet 12 may be provided. The bayonet 12 is used, for example, when installing the vehicle lighting device 1 on a housing 101 of a vehicle lamp 100, which will be described later. The bayonet 12 may be used for twist locks.

The flange 13 has a plate shape. The flange 13 has, for example, a substantially disk shape. A side surface of the flange 13 is located further outward of the vehicle lighting device 1 than a side surface of the bayonet 12.

The radiation fin 14 is provided on an opposite of the flange 13 from the attaching part 11 side. At least one radiation fin 14 may be provided. For example, as shown in FIG. 1, the socket 10 may be provided with a plurality of radiation fins 14. The plurality of radiation fins 14 may be arranged side by side in a predetermined direction. The radiation fins 14 have, for example, a plate shape or a cylindrical shape.

The connector holder 15 is provided on the opposite side of the flange 13 from the attaching part 11 side. The connector holder 15 may be provided side by side with the radiation fins 14. The connector holder 15 has a cylindrical shape, and a connector 105 having a seal member 105*a* is inserted therein.

The socket 10 has a function of holding the light-emitting module 20 and the power feed part 30, and a function of transferring heat generated in the light-emitting module 20 to the outside. Thus, the socket 10 is preferably formed from a material having high thermal conductivity. The socket 10 may be formed from metal, such as an aluminum alloy, for example.

Furthermore, in recent years, it is desired that the socket 10 be capable of efficiently dissipating heat generated in the light-emitting module 20 and be lightweight. Thus, the socket 10 may also be made of, for example, a highly thermally conductive resin. The highly thermally conductive resin is, for example, a resin such as PET (polyethylene terephthalate) or nylon mixed with a filler using carbon, aluminum oxide, or the like.

If the socket 10 includes a highly thermally conductive resin and has the attaching part 11, the bayonet 12, the flange 13, the radiation fins 14, and the connector holder 15 molded integrally therewith, the heat generated in the light-emitting module 20 may be efficiently dissipated. Further, the weight of the socket 10 may be decreased.

The power feed part 30 includes, for example, a plurality of power feed terminals 31 and a holding part 32.

The plurality of power feed terminals 31 may be made into a rod-shaped body. The plurality of power feed terminals 31 are arranged, for example, in a predetermined direction. One end of the plurality of power feed terminals 31 protrudes from a bottom surface 11*al* of the recess 11*a*. One end of the plurality of power feed terminals 31 is soldered to a wiring pattern 21*a* provided on a substrate 21. The other end of the plurality of power feed terminals 31 is exposed inside a hole of the connector holder 15. The connector 105 is fitted into the plurality of power feed terminals 31 exposed inside the hole of the connector holder 15. The plurality of power feed terminals 31 are made of metal such as copper alloy, for example. Moreover, the shape, configuration, material, etc. of the plurality of power feed terminals 31 are not limited to those illustrated, and may be changed as appropriate.

As mentioned above, the socket 10 is preferably made of a material with high thermal conductivity. However, materials with high thermal conductivity may also have electrical conductivity. For example, metals such as aluminum alloys and highly thermally conductive resins containing a filler using carbon have electrical conductivity. Thus, the holding part 32 is provided to insulate between the plurality of power feed terminals 31 and the electrically conductive socket 10. The holding part 32 also has a function of holding a plurality of power feed terminals 31. Moreover, in a case where the socket 10 is formed from a highly thermally conductive resin having insulating properties (for example, a highly thermally conductive resin containing a filler using aluminum oxide), the holding part 32 may be omitted. The holding part 32 is made of, for example, an insulating resin. For example, the holding part 32 may be press-fitted into a hole provided in the socket 10 or may be adhered to an inner wall of the hole.

The heat transfer part 40 has a plate shape and is provided between the socket 10 and the light-emitting module 20 (substrate 21). For example, as shown in FIG. 1, the heat transfer part 40 may be adhered to the bottom surface 11*al* of the recess 11*a*. Further, the heat transfer part 40 may be adhered to the inside of the recessed part provided on the bottom surface 11*al* of the recess 11*a*, attached to the inside of the recessed part via thermally conductive grease, or embedded in the inside of the recessed part by using an insert molding method.

The heat transfer part 40 is provided to facilitate the transfer of heat generated in the light-emitting module 20 to the socket 10. Thus, the heat transfer part 40 is formed from a material having high thermal conductivity. For example, the heat transfer part 40 may be formed from metal such as aluminum, an aluminum alloy, copper, or a copper alloy.

It should be noted that, for example, when the amount of heat generated in the light-emitting module 20 is relatively small or when the socket 10 is made of metal, the heat transfer part 40 may be omitted. When the heat transfer part 40 is omitted, the light-emitting module 20 (substrate 21) is adhered to the bottom surface Hal of the recess 11*a* or the like.

The light-emitting module 20 (substrate 21) is provided at one end of the socket 10. For example, the light-emitting module 20 is adhered onto the heat transfer part 40.

The light-emitting module 20 includes, for example, the substrate 21, a light-emitting element 22, a frame part 23, a sealing part 24, a circuit element 25, and a brightness controller 26.

The substrate 21 has a plate shape. A planar shape of the substrate 21 (the shape when viewed from the direction along a central axis 1*a* of the vehicle lighting device 1) is, for example, a substantially rectangle. The substrate 21 may be made of, for example, an inorganic material such as ceramics (e.g., aluminum oxide or aluminum nitride), or an organic material such as paper phenol or glass epoxy. Further, the substrate 21 may be a metal core substrate in which a surface of a metal plate is coated with an insulating material. The substrate 21 may have a single layer structure or a multilayer structure.

Further, the wiring pattern 21*a* is provided on the surface of the substrate 21. The wiring pattern 21*a* is formed of, for example, a material containing silver as a main component, a material containing copper as a main component, or the like. In addition, a covering part that covers the wiring pattern 21*a*, a membrane-like resistor device, and the like, as described later, may be provided. The covering part may, for example, include a glass material.

The light-emitting element 22 is provided on the substrate 21 (on a surface of the substrate 21 opposite to the socket 10 side). The light-emitting element 22 is electrically connected to the wiring pattern 21*a*. There may be five light-emitting elements 22. The five light-emitting elements 22 may be connected in series.

Figure 2:
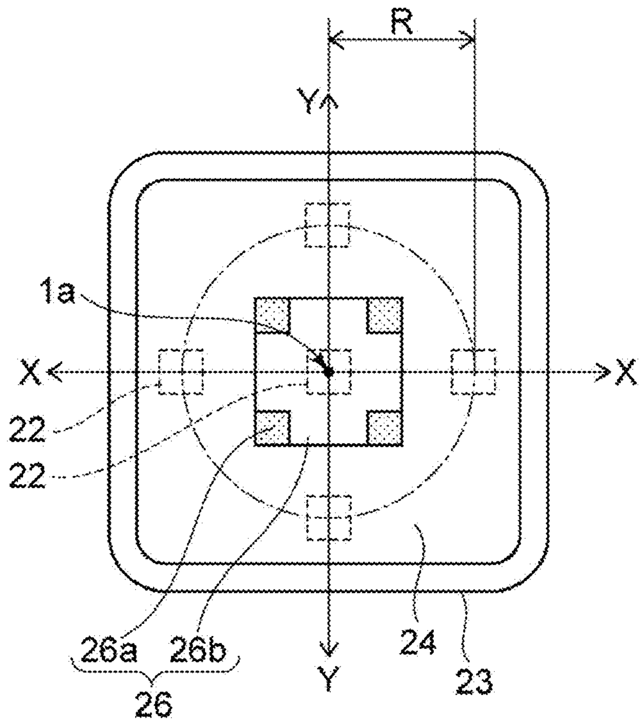
FIG. 2 is a schematic plan diagram for illustrating the configuration of the light-emitting elements and the brightness controller.

FIG. 2 is a schematic plan diagram for illustrating the configuration of the light-emitting elements 22 and the brightness controller 26. FIG. 2 shows five light-emitting elements 22 and the brightness controller 26 viewed from the direction along the central axis 1*a* of the vehicle lighting device 1.

In the following diagrams, arrow X and arrow Y represent two directions that are perpendicular to each other. In this case, the X direction and the Y direction are directions perpendicular to the central axis 1*a* of the vehicle lighting device 1.

As shown in FIG. 2, the center of one light-emitting element 22 may be provided at the position of the central axis 1*a* of the vehicle lighting device 1. The center of each of the four light-emitting elements 22 may be provided at a position that is rotationally symmetric on a circumference centered on the central axis 1*a* of the vehicle lighting device 1. In this case, the radius R of the circumference may be set to, for example, about 1 mm. Further, the center of the light-emitting element 22 may deviate from the above-mentioned position by an amount equivalent to a manufacturing error.

The light-emitting element 22 may be, for example, a light-emitting diode, an organic light-emitting diode, a laser diode, or the like.

The light-emitting element 22 may be a chip-shaped light-emitting element or a surface-mounted light-emitting element such as a PLCC (Plastic Leaded Chip Carrier) type. The light-emitting element 22 shown in FIG. 1 is a chip-shaped light-emitting element. In such a case, in consideration of downsize of the light-emitting module 20 and, by extension, downsize of the vehicle lighting device 1, it is preferable to use a chip-shaped light-emitting element. In the following, a case where the light-emitting element 22 is a chip-shaped light-emitting element will be described as an example.

The chip-shaped light-emitting element 22 may be mounted on the wiring pattern 21*a* by COB (Chip on Board). The chip-shaped light-emitting element 22 may be any of an upper electrode type light-emitting element, an upper and lower electrode type light-emitting element, and a flip chip type light-emitting element.

The frame part 23 is provided on the substrate 21. The frame part 23 is adhered to the substrate 21. The frame part 23 has a frame shape and surrounds the light-emitting element 22. The frame part 23 is made of, for example, thermoplastic resin. The frame part 23 may have the function of specifying the formation range of the sealing part 24 and the function of a reflector. The outline of the planar shape of the frame part 23 may be, for example, a rectangle or a circle. The outline of the planar shape of the frame part 23 illustrated in FIG. 1 and FIG. 2 is, for example, a square.

The sealing part 24 is provided on an inner side of the frame part 23. The sealing part 24 is provided so as to cover a region surrounded by the frame part 23. The sealing part 24 is provided so as to cover the light-emitting element 22.

The sealing part 24 includes a resin having translucency. The resin is, for example, silicone resin. Further, the sealing part 24 may also include a phosphor.

When the light-emitting element 22 is a surface-mounted light-emitting element, the frame part 23 and the sealing part 24 may be omitted.

The circuit element 25 may be a passive element or an active element configured to configure a light-emitting circuit having the light-emitting element 22. The circuit element 25 is provided on the substrate 21. The circuit element 25 is provided, for example, around the frame part 23 and electrically connected to the wiring pattern 21*a*. The circuit element 25 is electrically connected to the light-emitting element 22 via the wiring pattern 21*a*.

The circuit element 25 illustrated in FIG. 1 are a protection element 25*a*, a resistor 25*b*, and a control element 25*c*. However, the type of the circuit element 25 is not limited to the example shown, and may be changed as appropriate corresponding to the configuration of the light-emitting circuit having the light-emitting element 22. For example, in addition to the above, the circuit element 25 may be a condenser, a positive characteristic thermistor, a negative characteristic thermistor, an inductor, a surge absorber, a varistor, a transistor, an integrated circuit, a computing element, or the like.

The protection element 25*a* is provided, for example, to prevent a reverse voltage from being applied to the light-emitting element 22 and to prevent pulse noise from being applied to the light-emitting element 22 from the opposite direction. The protection element 25*a* may be, for example, a diode. The protection element 25*a* shown in FIG. 1 is a surface-mounted diode.

The resistor 25*b* may be, for example, a surface-mounted resistor, a resistor with lead wires (metal oxide film resistor), a film resistor formed using methods such as screen printing. Moreover, the resistor 25*b* shown in FIG. 1 is a surface-mounted resistor.

Here, since there are deviations in the forward voltage characteristics of the light-emitting element 22, if an applied voltage between an anode terminal and a ground terminal is constant, deviations occur in a brightness (luminous flux, luminance, luminosity, and illuminance) of the light irradiated from the light-emitting element 22. Thus, to ensure that the brightness of the light irradiated from the light-emitting element 22 falls within a predetermined range, a value of the current flowing in the light-emitting element 22 is kept within a predetermined range by the resistor 25*b* connected in series with the light-emitting element 22. In such a case, by changing a resistance value of the resistor 25*b*, the value of the current flowing in the light-emitting element 22 is made to be within a predetermined range.

In a case where the resistor 25*b* is a surface-mounted resistor, a resistor with a lead wire, or the like, the resistor 25*b* having an appropriate resistance value is selected according to the forward voltage characteristics of the light-emitting element 22. In a case where the resistor 25*b* is a film resistor, the resistance value may be increased by removing a part of the resistor 25*b*. For example, by irradiating a film resistor with a laser beam, a part of the film resistor may be easily removed. Moreover, the number, configuration, size, etc. of the resistor 25*a* is not limited to those illustrated, and may be changed as appropriate depending on the number, specifications, etc. of the light-emitting elements 22.

The control element 25*c* is provided, for example, to switch the voltage applied to the light-emitting element 22 and to perform temperature derating. However, the functions and uses of the control element 25*c* are not limited to those illustrated. The control element 25*c* may be, for example, a transistor or an integrated circuit. Moreover, the control element 25*c* illustrated in FIG. 1 is a surface-mounted integrated circuit.

As will be described later, the vehicle lighting device 1 is attached to a housing 101 provided in a vehicle lamp 100. Further, the light emitted from the vehicle lighting device 1 is incident on an optical element 103 provided in the vehicle lamp 100. Thus, the brightness distribution of the portion of the vehicle lighting device 1 from which light is emitted has a significant effect on the optical design of the optical element 103 provided in the vehicle lamp 100. In this case, the portion of the vehicle lighting device 1 from which light is emitted may be a region inside the frame part 23 (the end surface of the sealing part 24 on the opposite side to the substrate 21 side).

Further, in recent years, there has been a demand for increasing the amount of light emitted from the vehicle lighting device 1.

In this case, as shown in FIG. 2, when the center of one light-emitting element 22 is provided at the position of the central axis 1*a* of the vehicle lighting device 1, and the center of each of the four light-emitting elements 22 is provided at a position that is rotationally symmetric on a circumference centered on the central axis 1*a* of the vehicle lighting device 1, the brightness distribution that is symmetrical with respect to the central axis 1*a* of the vehicle lighting device 1 may be obtained easily. Further, by providing five light-emitting elements 22, the amount of light emitted from the vehicle lighting device 1 may be increased compared to the case where four light-emitting elements 22 are provided.

However, doing so causes a new problem in that the brightness becomes too high in the center portion of the portion of the vehicle lighting device 1 from which light is emitted (the portion including the position of the central axis 1*a* of the end surface of the sealing part 24 opposite to the substrate 21 side).

Thus, the light-emitting module 20 is provided with a brightness controller 26. The brightness controller 26 may be provided in the sealing part 24. In this case, as shown in FIG. 1 and FIG. 2, the brightness controller 26 may be provided on the end surface of the sealing part 24 opposite to the substrate 21 side. Further, the brightness controller 26 may also be embedded inside the sealing part 24.

When the brightness controller 26 is provided on the end surface of the sealing part 24, the brightness controller 26 may be attached to the end surface of the sealing part 24, a light-shielding part 26*a* of the brightness controller 26 described later may be printed on the end surface of the sealing part 24, or a resin that is difficult for light to transmit (for example, a white resin) may be supplied to the end surface of the sealing part 24 to form the light-shielding part 26*a*. When the brightness controller 26 is embedded inside the sealing part 24, as described above, the brightness controller 26 is provided on the sealing part 24 and a resin is further supplied on the brightness controller 26 to form the sealing part 24.

As shown in FIG. 2, the brightness controller 26 is provided on the light-emitting side of the light-emitting element 22, and has a plurality of light-shielding parts 26*a* and a light-transmitting part 26*b*. For example, the plurality of light-shielding parts 26*a* and the light-transmitting part 26*b* may be integrally formed.

When the plurality of light-shielding parts 26*a* are directly provided on the sealing part 24, the sealing part 24 exposed to the inside of the brightness controller 26 becomes the light-transmitting part 26*b*. However, when the light-shielding parts 26*a* and the light-transmitting part 26*b* are integrally formed, the brightness controller 26 may be manufactured in advance. Thus, the productivity of the light-emitting module 20 may be improved, and the manufacturing cost of the vehicle lighting device 1 may be reduced.

The light-shielding parts 26*a* are in the form of a film and contain a material that is less transparent to light than the sealing part 24. The light-shielding part 26*a* includes, for example, a metal or a resin that is difficult for light to transmit (for example, a white resin).

The light-transmitting part 26*b* has a film or plate shape and contains a material that easily transmits light. The light-transmitting part 26*b* contains, for example, a light-transmitting resin such as polycarbonate resin or silicone resin, or glass.

Figure 3:
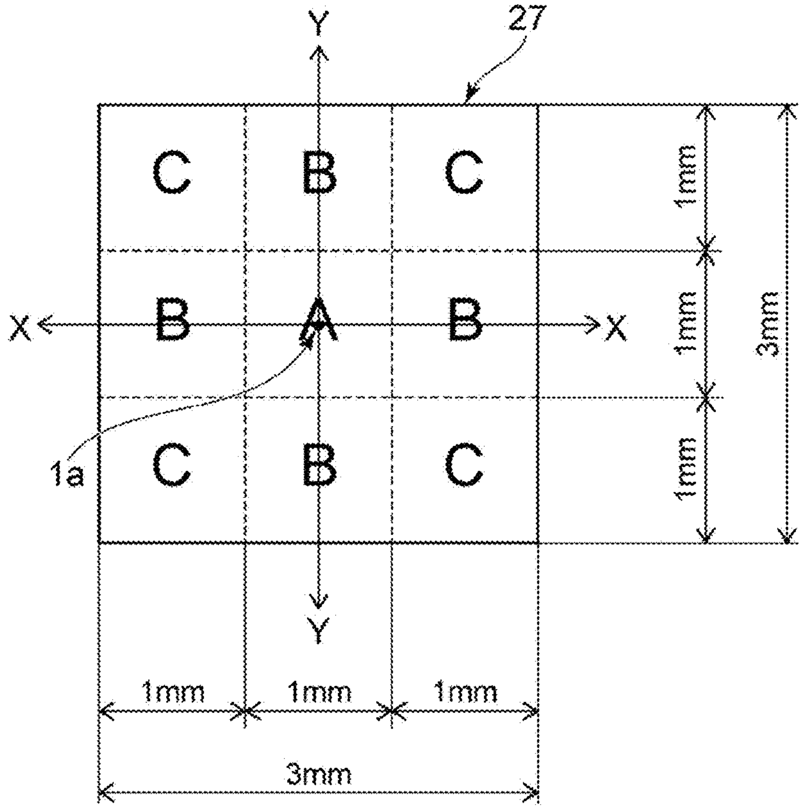
FIG. 3 is a diagram for illustrating the evaluation of the brightness distribution of a portion of the vehicle lighting device from which light is emitted.

FIG. 3 is a diagram for illustrating the evaluation of the brightness distribution of a portion of the vehicle lighting device 1 from which light is emitted.

As shown in FIG. 3, the brightness distribution may be evaluated in a square evaluation region 27 having a side length of 3 mm and centered on the central axis 1*a* of the vehicle lighting device 1. In addition, the evaluation region 27 is divided into nine equal regions, and the light emission intensity in each of the nine equal regions (square regions with sides of 1 mm) is calculated to evaluate the brightness distribution in the evaluation region 27, and ultimately the brightness distribution of the portion of the vehicle lighting device 1 from which light is emitted.

In this case, it is preferable that the light emission intensity in each region falls within the following range.

Light emission intensity of region A≤10%

Light emission intensity of each region B≥20%

Light emission intensity of each region C≤10%

Light emission intensity of region A+light emission intensities of all region B+light emission intensities of all region C≥90%

Moreover, the light emission intensity in a region with a diameter of 18.5 mm and centered on the central axis 1*a* of the vehicle lighting device 1 is set to 100%.

For example, the light emission intensity of region A is "(light emission intensity of region A/light emission intensity in a region with a diameter of 18.5 mm)×100(%)". The light emission intensity of region A is used to evaluate the brightness in the vicinity of the central axis 1*a* of the vehicle lighting device 1.

For example, the light emission intensity of each region B is "(light emission intensity in each region B/light emission intensity in a region with a diameter of 18.5 mm)×100(%)". The light emission intensity of each region B evaluates the brightness of each region adjacent to region Ain the X direction or the Y direction.

For example, the light emission intensity of each region C is "(light emission intensity in each region C/light emission intensity in a region with a diameter of 18.5 mm)×100(%)". The light emission intensity of each region C evaluates the brightness of each region adjacent to region Ain the diagonal direction.

That is, the light emission intensity of each region B and the light emission intensity of each region C evaluate the brightness in the periphery of region A.

Further, in order to perform an evaluation using such evaluation region 27, the dimensions of the portion of the vehicle lighting device 1 from which light is emitted when viewed from the direction along the central axis 1*a* of the vehicle lighting device 1 may be made larger than the dimension of the evaluation region 27. For example, the dimension of one side of the portion of the vehicle lighting device 1 from which light is emitted when viewed from the direction along the central axis 1*a* of the vehicle lighting device 1 may be 3 mm or more and 6 mm or less. In this case, the area of the portion of the vehicle lighting device 1 from which light is emitted is 9 $mm^2$ or more and 36 $mm^2$ or less. For example, the outline of the frame part 23 when viewed from the direction along the central axis 1*a* of the vehicle lighting device 1 may be a square, and the dimension of one side of the inner wall of the frame part 23 may be 3 mm or more and 6 mm or less.

Moreover, although the outline of the frame part 23 is a square in the above example, the same may be applied to the case where the outline of the frame part 23 is a rectangle or a circle. That is, when viewed from the direction along the central axis 1*a* of the vehicle lighting device 1, it is necessary to set the evaluation region 27 inside the frame part 23.

However, when the outline of the frame part 23 is a square, the evaluation using the evaluation region 27 described above becomes easier. Thus, it is preferable that the outline of the frame part 23 when viewed from the direction along the central axis 1*a* of the vehicle lighting device 1 is a square, and the dimension of one side of the inner wall of the frame part 23 is about 3 mm.

Figure 4:
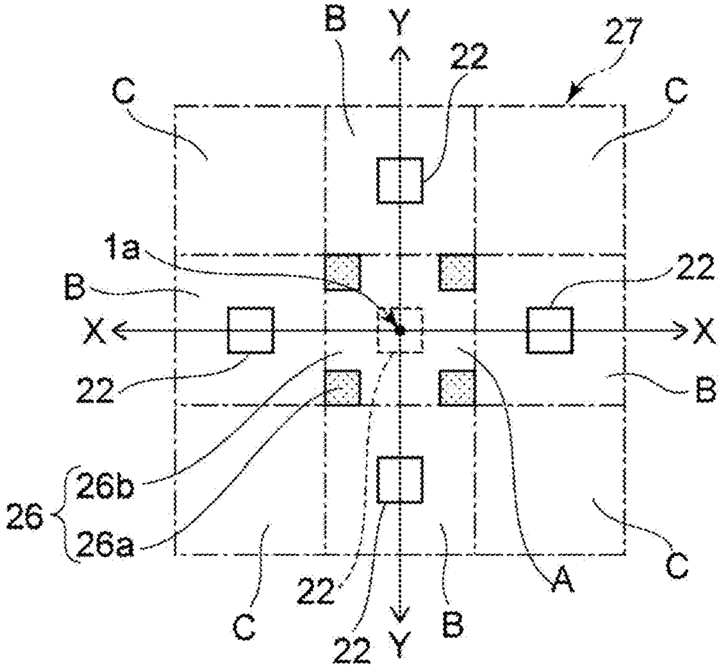
FIG. 4 is a schematic plan diagram for illustrating the configuration of the evaluation region and the light-emitting element.

FIG. 4 is a schematic plan diagram for illustrating the configuration of the evaluation region 27 and the light-emitting element 22.

As shown in FIG. 4, when viewed from the direction along the central axis 1*a* of the vehicle lighting device 1, the center of the evaluation region 27 may be provided at a position overlapping the central axis 1*a*. Moreover, the center of one light-emitting element 22 may be provided at a position overlapping the center of region A. The center of each of the four light-emitting elements 22 may be provided at a position overlapping the center of region B.

Further, the center of the brightness controller 26 may be provided at a position overlapping the center of region A. For example, the brightness controller 26 faces one light-emitting element 22 provided at the central axis 1*a* of the vehicle lighting device 1. In this case, the center of one light-emitting element 22 and the center of the brightness controller 26 may be made to overlap the center of region A. The brightness controller 26 does not face the four light-emitting elements 22 provided at positions on a circumference centered on the central axis 1*a* of the vehicle lighting device 1.

The shape and dimensions of the brightness controller 26 may be, for example, the same as those of the region A. For example, as shown in FIG. 2 and FIG. 4, the brightness controller 26 may be square in shape. Further, each of the plurality of light-shielding parts 26*a* may be provided, for example, in the diagonal region of the brightness controller 26. For example, one light-shielding part 26*a* may be provided at each of the four corners of the brightness controller 26 with a square shape. Moreover, the plurality of light-shielding parts 26*a* are not provided at the position on the central axis 1*a* of the vehicle lighting device 1.

The shape of the light-shielding part 26*a* when viewed from the direction along the central axis 1*a* of the vehicle lighting device 1 is not particularly limited. For example, the shape of the light-shielding part 26*a* may be a quadrilateral such as a square or a rectangle, or may be a part of a circle.

Moreover, when viewed from the direction along the central axis 1*a* of the vehicle lighting device 1, the light-shielding part 26*a* may not be provided in the central region (a region including the central axis 1*a*) of the brightness controller 26 and in regions adjacent to the central region in the X direction and the Y direction.

When the brightness controller 26 having the light-shielding part 26*a* is provided, the brightness distribution of the portion of the vehicle lighting device 1 from which light is emitted may be controlled.

In this case, according to the knowledge obtained by the present inventors, when the total area of the plurality of light-shielding parts 26*a* is 55.5% or more and 65.0% or less of the area of the brightness controller 26, the condition for the light emission intensity in the evaluation region 27 described above may be satisfied.

Figure 5:
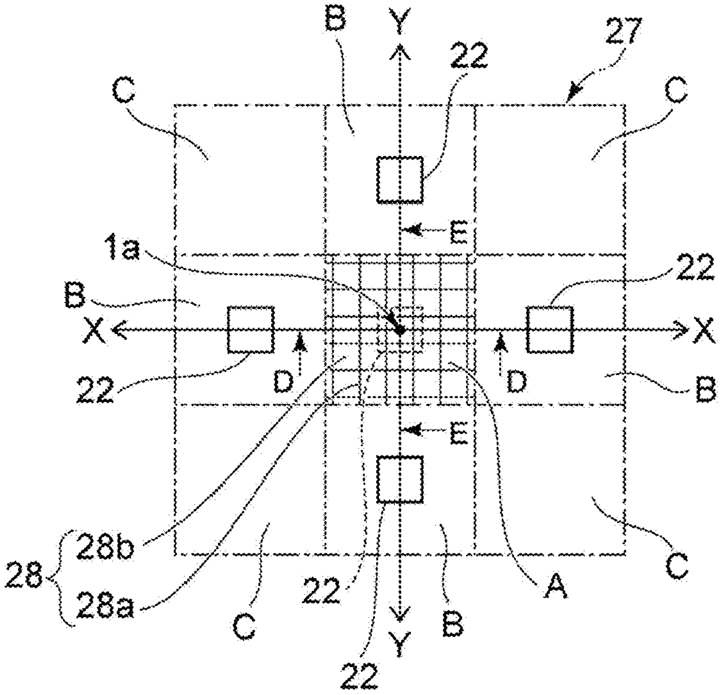
FIG. 5 is a schematic plan diagram for illustrating the brightness controller according to another embodiment.
Figure 6:
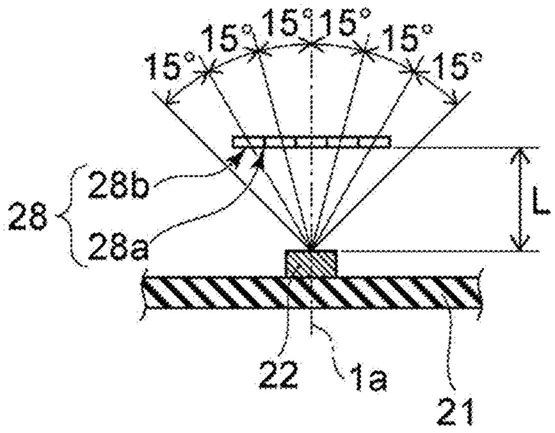
FIG. 6 is a schematic cross-sectional diagram of the brightness controller in FIG. 5 taken along the line D-D direction or the line E-E direction.

FIG. 5 is a schematic plan diagram for illustrating the brightness controller 28 according to another embodiment. FIG. 6 is a schematic cross-sectional diagram of the brightness controller 28 in FIG. 5 taken along the line D-D direction or the line E-E direction.

As shown in FIG. 5 and FIG. 6, the brightness controller 28 has, for example, a plurality of light-shielding parts 28*a* and a light-transmitting part 28*b*. The shape and dimensions of the brightness controller 28 when viewed from the direction along the central axis 1*a* of the vehicle lighting device 1 may be the same as the shape and dimensions of the brightness controller 26.

As in the case of the brightness controller 26 described above, the light-shielding parts 28*a* and the light-transmitting part 28*b* may be integrally formed, or the light-shielding parts 28*a* may be provided directly on the sealing part 24. The light-transmitting part 28*b* has a film or plate shape. The material of the light-transmitting part 28*b* may be the same as the material of the light-transmitting part 26*b* described above.

The plurality of light-shielding parts 28*a* have a linear shape. The plurality of light-shielding parts 28*a* may be arranged, for example, in a grid pattern. For example, one light-shielding part 28*a* extends in the X direction. For example, the other light-shielding part 28*a* extends in the Y direction.

By providing such a brightness controller 28, the brightness distribution of the portion of the vehicle lighting device 1 from which light is emitted may be controlled.

In this case, when the total area of the plurality of light-shielding parts 28*a* is 55.5% or more and 65.0% or less of the area of the brightness controller 28, the condition for the light emission intensity in the evaluation region 27 described above may be satisfied.

Further, as shown in FIG. 6, the light-shielding part 28*a* may not be provided in the direction of an angle that is an integer multiple of 0° and 150 from the center of the light emission surface of the light-emitting element 22 provided at the position of the central axis 1*a* of the vehicle lighting device 1. For example, by appropriately setting the position, number, and thickness of the light-shielding part 28*a* and the distance L between the brightness controller 28 and the light-emitting element 22, it is possible to avoid providing the light-shielding part 28*a* in such a direction.

The above example shows the case where the light-emitting element 22 is a chip-shaped light-emitting element. As previously mentioned, the light-emitting element may be a surface-mounted light-emitting element 22*a*.

Figure 7:
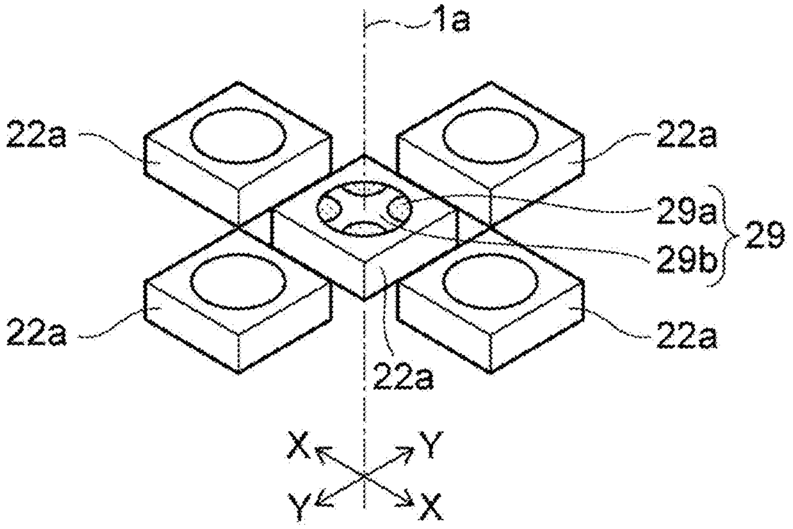
FIG. 7 is a schematic perspective diagram for illustrating the brightness controller provided in a surface-mounted light-emitting element.

FIG. 7 is a schematic perspective diagram for illustrating the brightness controller 29 provided in a surface-mounted light-emitting element 22*a*.

As shown in FIG. 7, similarly to the case of the chip-shaped light-emitting element 22, the center of one light-emitting element 22*a* may be provided at the position of the central axis 1*a* of the vehicle lighting device 1, and the center of each of the four light-emitting elements 22*a* may be provided at a position that is rotationally symmetric on a circumference centered on the central axis 1*a* of the vehicle lighting device 1.

Then, a brightness controller 29 may be provided on the light emission surface of the light-emitting element 22*a* provided at the position of the central axis 1*a* of the vehicle lighting device 1. The brightness controller 29 has, for example, a plurality of light-shielding parts 29*a* and a light-transmitting part 29*b*. In this case, the configuration, number, material, etc. of the plurality of light-shielding parts 29*a* may be the same as the configuration, number, material, etc. of the plurality of light-shielding parts 26*a*. The configuration, material, etc. of the light-transmitting part 29*b* may be the same as the configuration, material, etc. of the light-transmitting part 26*b*. The light-shielding parts 29*a* may be formed by, for example, using a dispenser or the like to supply a resin that is difficult for light to transmit (for example, a white resin) onto the light emission surface.
Even if the brightness controller 29 is provided, the same effects as those of the brightness controller 26 described above may be obtained.

Further, the light emission surface of the surface-mounted light-emitting element 22*a* may be provided with the light-shielding parts which are linear in shape illustrated in FIG. 5 and FIG. 6.
In this way, the same effect as that of the brightness controller 28 described above may be obtained.

(Vehicle Lamp)

In one embodiment of the disclosure, the vehicle lamp 100 including the vehicle lighting device 1 may be provided. For the above-mentioned description of the vehicle lighting device 1 and modified examples of the vehicle lighting device 1 (for example, the brightness controller 28, the brightness controller 29, or those having the features of the disclosure, where components are added, deleted, or the design is changed as appropriate by those skilled in the art), any of the above may be applied to the vehicle lamp 100.

Note that, in the following, a case where the vehicle lamp 100 is a front combination light provided in an automobile will be described as an example. However, the vehicle lamp 100 is not limited to a front combination light provided in an automobile. The vehicle lamp 100 may be any vehicle lamp installed in an automobile, a railway vehicle, or the like.

Figure 8:
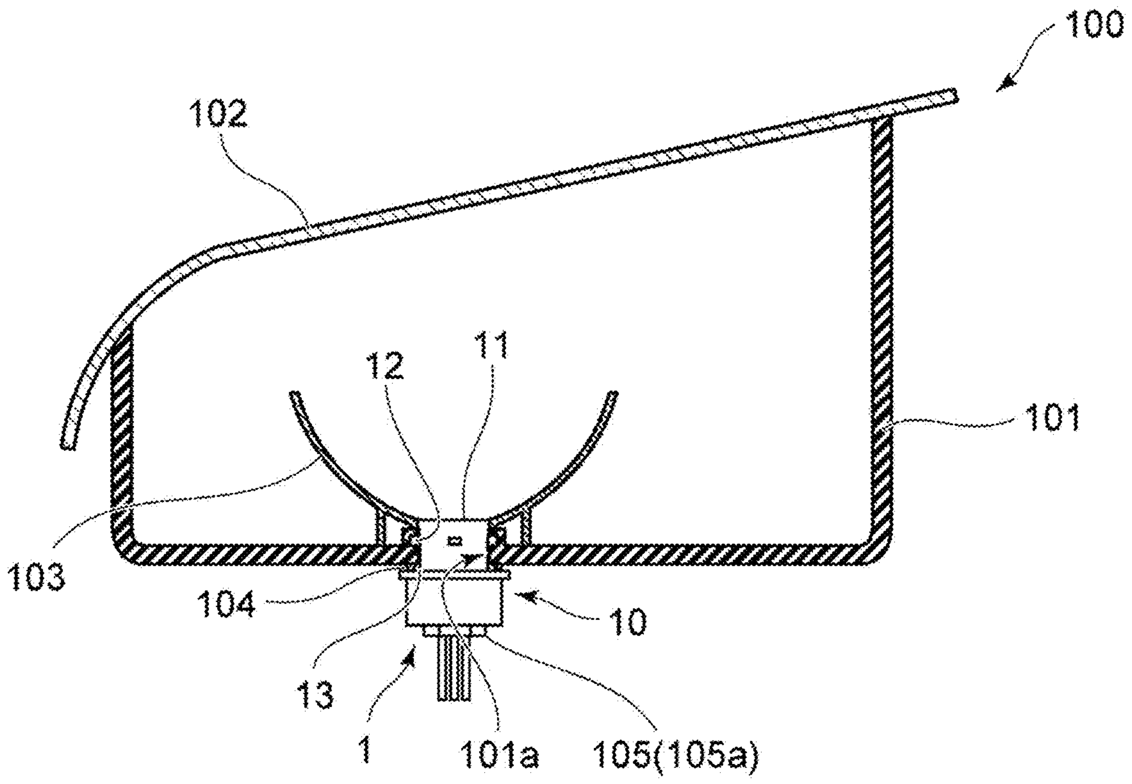
FIG. 8 is a schematic partial cross-sectional diagram illustrating the vehicle lamp.

FIG. 8 is a schematic partial cross-sectional diagram for illustrating the vehicle lamp 100. As shown in FIG. 8, the vehicle lamp 100 includes, for example, the vehicle lighting device 1, the housing 101, a cover 102, an optical element 103, a seal member 104, and the connector 105.

The vehicle lighting device 1 is attached to the housing 101. The housing 101 holds the attaching part 11. The housing 101 has a box shape with one end open. The housing 101 is made of, for example, resin that does not transmit light. A bottom surface of the housing 101 is provided with a mounting hole 101*a* into which a part of the attaching part 11 provided with the bayonet 12 is inserted. A recess into which the bayonet 12 provided on the attaching part 11 is inserted is provided at a periphery of the mounting hole 101*a*. Moreover, although the case in which the mounting hole 101*a* is directly provided in the housing 101 has been illustrated, a mounting member having the mounting hole 101*a* may be provided in the housing 101.

When attaching the vehicle lighting device 1 to the vehicle lamp 100, the part of the attaching part 11 provided with the bayonet 12 is inserted into the mounting hole 101*a*, and the vehicle lighting device 1 is rotated. Then, for example, the bayonet 12 is held in a fitting part provided at the periphery of the mounting hole 101*a*. This type of attachment method is called a twist lock.

The cover 102 is provided to close the opening of the housing 101. The cover 102 is made of translucent resin or the like. The cover 102 may also have a function such as a lens.

Light emitted from the vehicle lighting device 1 is incident on the optical element 103. The optical element 103 reflects, diffuses, guides, condenses, and forms a predetermined light distribution pattern for the light emitted from the vehicle lighting device 1. For example, the optical element 103 shown in FIG. 8 is a reflector. In such a case, the optical element 103 reflects the light emitted from the vehicle lighting device 1 to form a predetermined light distribution pattern.

The seal member 104 is provided between the flange 13 and the housing 101. The seal member 104 has an annular shape and is made of an elastic material such as rubber or silicone resin.

When the vehicle lighting device 1 is attached to the vehicle lamp 100, the seal member 104 is sandwiched between the flange 13 and the housing 101. Thus, the seal member 104 may seal an internal space of the housing 101. Further, the bayonet 12 is pressed against the housing 101 due to an elastic force of the seal member 104. Thus, it is possible to suppress the vehicle lighting device 1 from detaching from the housing 101.

The connector 105 is fitted to the ends of the plurality of power feed terminals 31 exposed to the inside of the connector holder 15. A lighting circuit or the like is electrically connected to the connector 105. Thus, by fitting the connector 105 to the ends of the plurality of power feed terminals 31, a lighting circuit or the like may be electrically connected to the light-emitting element 22.

Further, the connector 105 is provided with the seal member 105*a*. When the connector 105 having the seal member 105*a* is inserted into the connector holder 15, the inside of the connector holder 15 is sealed such that it is watertight.

Although several embodiments of the disclosure have been illustrated above, these embodiments are presented as examples and are not intended to limit the scope of the disclosure. These novel embodiments may be implemented in various other forms, and various omissions, substitutions, modifications, etc. may be made without departing from the gist of the disclosure. These embodiments and their modifications are included within the scope and gist of the disclosure, as well as within the scope of the disclosure described in the claims and its equivalents. Further, each of the embodiments described above may be implemented in combination with each other.

Supplementary notes regarding the above-described embodiments will be shown below.

(Supplementary Note 1)

A vehicle lighting device, including:
- a socket;
- five light-emitting elements, provided on one end side of the socket; and
- a brightness controller, provided on a light-emitting side of the light-emitting elements and having a plurality of light-shielding parts and a light-transmitting part;
- wherein one of the light-emitting elements is provided at a position on a central axis of a vehicle lighting device, and four of the light-emitting elements are provided at positions that are rotationally symmetric on a circumference centered on the central axis, respectively, the brightness controller faces the one light-emitting element provided at a position on the central axis, and does not face the four light-emitting elements provided at a position on the circumference, and the plurality of light-shielding parts provided in the brightness controller are not provided at positions on the central axis.

(Supplementary Note 2)

The vehicle lighting device according to Supplementary note 1, wherein a total area of the plurality of light-shielding parts is 55.5% or more and 65.0% or less of an area of the brightness controller.

(Supplementary Note 3)

The vehicle lighting device according to Supplementary note 1 or 2, wherein a shape of the brightness controller when viewed from a direction along the central axis is square, and one of the light-shielding parts having a film shape is provided at each of four corners of the brightness controller.

(Supplementary Note 4)

The vehicle lighting device according to Supplementary note 1 or 2, wherein a shape of the brightness controller when viewed from a direction along the central axis is square, and the plurality of light-shielding parts, which are linear in shape, are arranged in a grid pattern.

(Supplementary Note 5)

A vehicle lamp, including: a vehicle lighting device according to Supplementary note 1 to 4; and a housing, to which the vehicle lighting device is attached.

What is claimed is:

1. A vehicle lighting device, comprising:

a socket;

five light-emitting elements, provided on one end side of the socket; and a brightness controller, provided on a light-emitting side of the light-emitting elements and having a plurality of light-shielding parts and a light-transmitting part;

wherein one of the light-emitting elements is provided at a position on a central axis of a vehicle lighting device, and four of the light-emitting elements are provided at positions that are rotationally symmetric on a circumference centered on the central axis, respectively, the brightness controller faces the one light-emitting element provided at a position on the central axis, and does not face the four light-emitting elements provided at a position on the circumference, and the plurality of light-shielding parts provided in the brightness controller are not provided at positions on the central axis.

2. The vehicle lighting device according to claim 1, wherein a total area of the plurality of light-shielding parts is 55.5% or more and 65.0% or less of an area of the brightness controller.

3. The vehicle lighting device according to claim 2, wherein a shape of the brightness controller when viewed from a direction along the central axis is square, and one of the light-shielding parts having a film shape is provided at each of four corners of the brightness controller.

4. The vehicle lighting device according to claim 2, wherein a shape of the brightness controller when viewed from a direction along the central axis is square, and the plurality of light-shielding parts, which are linear in shape, are arranged in a grid pattern.

5. The vehicle lighting device according to claim 1, wherein a shape of the brightness controller when viewed from a direction along the central axis is square, and one of the light-shielding parts having a film shape is provided at each of four corners of the brightness controller.

6. The vehicle lighting device according to claim 1, wherein a shape of the brightness controller when viewed from a direction along the central axis is square, and the plurality of light-shielding parts, which are linear in shape, are arranged in a grid pattern.

7. A vehicle lamp, comprising:

a vehicle lighting device according to claim 1; and a housing, to which the vehicle lighting device is attached.

* * * * *